United States Patent [19]

Bobbs et al.

[11] Patent Number: 4,922,495
[45] Date of Patent: May 1, 1990

[54] BROAD BAND CROSSED-BEAM RAMAN AMPLIFIER

[75] Inventors: Bradley L. Bobbs, Granada Hills; Jeffrey A. Goldstone, Newbury Park, both of Calif.

[73] Assignee: Rockwell International Corporation, El Segundo, Calif.

[21] Appl. No.: 390,131

[22] Filed: Aug. 7, 1989

[51] Int. Cl.$^5$ ............................................... H01S 3/30
[52] U.S. Cl. ........................................ 372/3; 372/102; 307/426
[58] Field of Search ............................ 372/3, 98, 102; 307/426

[56] References Cited

U.S. PATENT DOCUMENTS 3,515,897  6/1970  Culver ............................... 307/426
4,742,522  5/1988  Linford .................................. 372/2

OTHER PUBLICATIONS

Bradley L. Bobbs and Jeffrey A. Goldstone "The Zigzag Broadband Ramna Amplifier" presented 1/18/89 Proc. SPIE v. 1060 (1989).
J. A. Goldstone, Bradley Bobbs and Michael M. Johnson Angular Compensation for Multiline Dispersion in Raman Amplifiers Proc. SPIE 874,107 (1988) presented Jan. 10, 1988.

Air Force patent application, Ser. No. 07/286,029, Filing date: 12/14/88, Inventors: Bobbs and Goldstone.

Primary Examiner—Léon Scott, Jr.
Attorney, Agent, or Firm—H. Fredrick Hamann; Harry B. Field; Steven E. Kahm

[57] ABSTRACT

This invention relates to increasing the power output of a broadband Raman amplifier by angle-tuned phase matching of either multiple individual pump lines or a continuous spectra in a pump beam 1 relative to their corresponding Stokes lines or Stokes spectra in the Stokes seed beam 2 so that energy can transfer from the pump lines to the Stokes lines more efficiently. The invention can work in any solid or fluid Raman medium. The Raman cell could be in a length of optical fiber using the internal reflections in the optical fibers as mirrors 8. By using angle tuning, enhancement of the Raman gain is produced which allows the Raman amplifier to achieve high power output with much larger pump bandwidths than were previously possible. The input pump beam 1 is fanned by diffraction grating 3 so that the pump lines are at the proper angle to be phase matched with the Stokes seed beam 2 which may also be fanned. The invention works with a crossed-beam near-collinear amplifier or a crossed-beam wide angle, zigzag amplifier. The fanned Stokes output beam 12 can be made into an unfanned Stokes beam 14 by use of a diffraction grating 13.

10 Claims, 2 Drawing Sheets

BROAD BAND CROSSED-BEAM RAMAN AMPLIFIER

FIELD OF INVENTION

This invention relates to modifying the frequency and phase front of one or more laser beams by use of angle tuned phase matching in a crossed-beam Raman amplifier.

BACKGROUND OF THE INVENTION

There is a need for high power laser beams with specific frequency and phase front requirements for use in the defense industry and for other applications. One means of modifying the frequency and phase front of a laser beam is by use of a Raman amplifier.

Raman amplifiers exist having either collinear or crossed pump and Stokes beams. The crossed-beam geometry, however, only works well for narrow pump band spectra, which severely limits the possibilities for pump lasers.

Wide angle crossed-beam Raman amplifiers have important advantages over collinear beam Raman amplifiers: better transverse intensity homogeneity in the Stokes output, reduced phase aberration, ease of combining the seed with one or more pump inputs and avoidance of competing nonlinear processes having near-collinear phase matching angles. In the past, despite their intrinsic advantages, the use of crossed-beam Raman amplifiers has been restricted to much narrower pump band spectra than for collinear Raman amplifiers, which has limited their applicability.

SUMMARY OF THE INVENTION

The invention presented here increases the power output of a Raman amplifier in a crossed beam configuration by using angle-tuning to increase the power transfer between a broad band of pump beam spectral lines and their corresponding Stokes beam lines.

DETAILED DESCRIPTION OF THE PREFERRED EMBODIMENT

Figure 1:
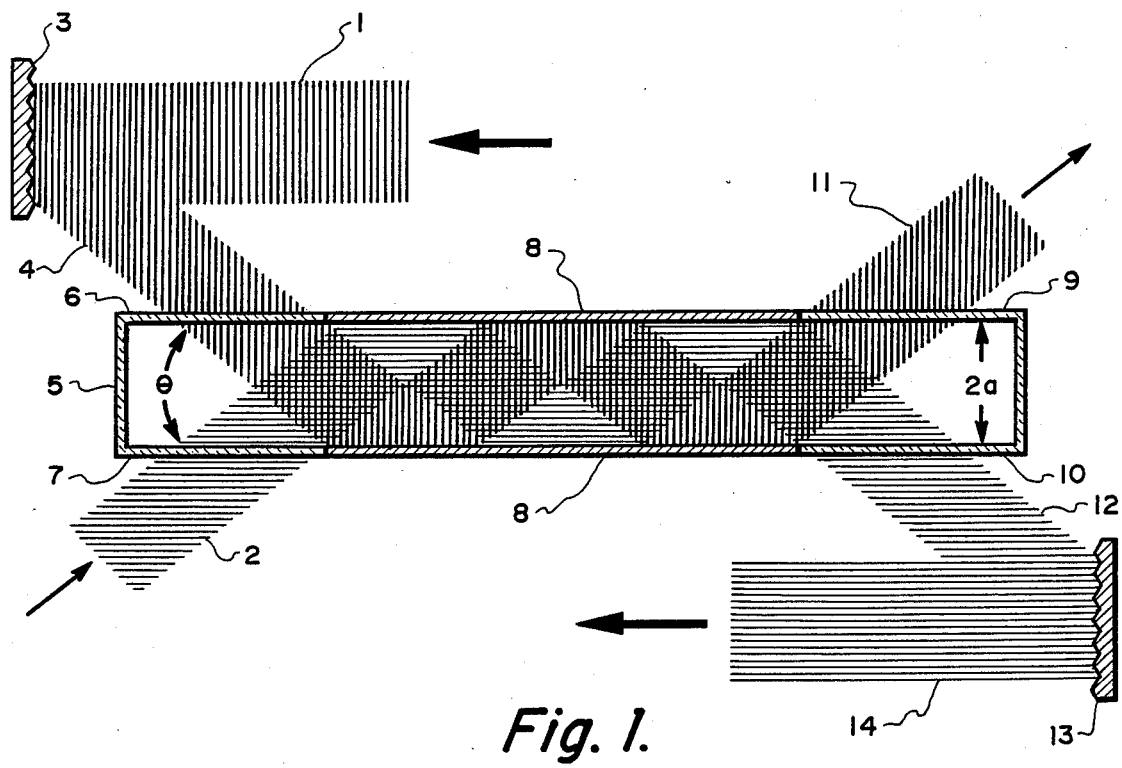
FIG. 1 shows a schematic view of the broad band wide angle crossed-beam Raman amplifier.

FIG. 1 shows a schematic view of the broad band crossed-beam wide angle Raman amplifier. It shows an input pump beam 1 which consists of a broad band of wavelengths. The broader the input pump beam band spectrum the larger the phase-matched gain enhancement possible. The input pump beam spectrum may be either continuous or consist of any number of discrete lines. The input pump beam is produced by a laser. The Stokes seed beam 2 is at a lower frequency and power than the pump, and may be derived from a portion of the input pump beam in a Raman generator. The center frequency of the Stokes seed beam is the difference frequency between the input pump beam center frequency and the resonant frequency of the Raman medium.

As used herein, the pump beam may have a spectrum consisting of a number of discrete lines, each of negligible spectral width, or the spectrum may contain regions of significant spectral width over which the pump beam power is spread continuously.

As used herein, "pump lines" means a discrete line spectrum case and continuous pump spectrum is anything else.

The spectrum of the input pump beam 1 is fanned by an input diffraction grating 3 to provide the required angles for angle-tuned phase matching. Since the input pump beam frequencies and the desired angles for the angle tuning are known the line spacing needed on the diffraction grating 3 and its orientation can be easily calculated. Although a diffraction grating is used here a prism or other means for spreading the wavelengths may also be used.

The fanned pump beam 4 is then directed through window 6 into a cell 5 containing a Raman-active medium. The medium should be transparent to both pump and Stokes radiation frequencies, and have a large Raman gain coefficient for stimulated scattering from internal excitations. For example, $H_2$ gas at a few atmospheres of pressure has strong stimulated Raman scattering from rotational and/or vibrational molecular excitations. Other Raman media may also be appropriate, depending on the application.

The Stokes seed beam 2 is directed into the Raman cell 5 through window 7. As will be explained herein the Stokes seed beam can be a single line which will generate other Stokes lines of the proper phase or it can be a fanned Stokes seed beam with angles corresponding to the angles of the pump beam so as to be phase-matched therewith.

The input window 6 for the pump beam 4 and the input window 7 for the Stokes seed beam 2 let the beams into the cell. The windows may be oriented at Brewster's angle or at near-normal incidence to maximize the transmission through the window.

The fanned pump beam 4 and the Stokes seed beam 2 are introduced to the Raman cell 5 at wide angles several degrees or more) such that the beams zigzag across the Raman cell 5 by bouncing off parallel mirrors [which are provided to minimize beam losses at reflection from the cell walls.

During the time the beams are zigzagging they cross each other many times, yielding a long total interaction path length. Energy is transferred from the pump beam spectral lines to their corresponding Stokes beam lines when the two beams overlap. The angles necessary for angle tuning are maintained after each reflection off the mirrors 8.

The windows 9 and 10 are placed at a position such that the residual pump beam 11 exits from window 9 and is dumped, and the now amplified Stokes beam 12 exits window 10.

It is generally desirable to have the output Stokes beams 14 free from spectral fanning; therefore a diffraction grating 13 is employed to diffract the spectrally fanned beam 12 and make the resultant beam 14 unfanned. As with the input grating 3 it is easy to calculate the line spacing and orientation needed in the output diffraction grating 13 to change a known fanned beam 12 into an unfanned beam 14.

The spectrum of the output Stokes beam 14 will have approximately the same width as the spectrum of the input pump beam 1. If the pump spectrum contains discrete lines, then the output Stokes spectrum will have the same number of discrete lines. If the pump beam is continuous, the Stokes beam will be continuous and have the same characteristics as the pump beam. The angle-tuned broad band wide angle crossed-beam Raman amplifier provides efficient energy transfer over a broad pump spectrum: whereas previous wide angle cross-beam Raman amplifiers were limited to very narrow pump spectra (typically, less than a few GHz in width).

In order for there to be efficient energy transfer between the pump and Stokes beams, the beams should be in phase (i.e., the nonlinear polarization waves produced by the beams should all be in phase) as much as possible over their interaction path length.

In a collinear Raman amplifier with parallel pump and Stokes beams, broadband pump and Stokes beams may remain in phase over a gain length and thereby transfer energy efficiently. With extremely broad spectra, however, linear medium dispersion causes the beams to become out of phase within a gain length, and efficiency is reduced.

Figure 2:
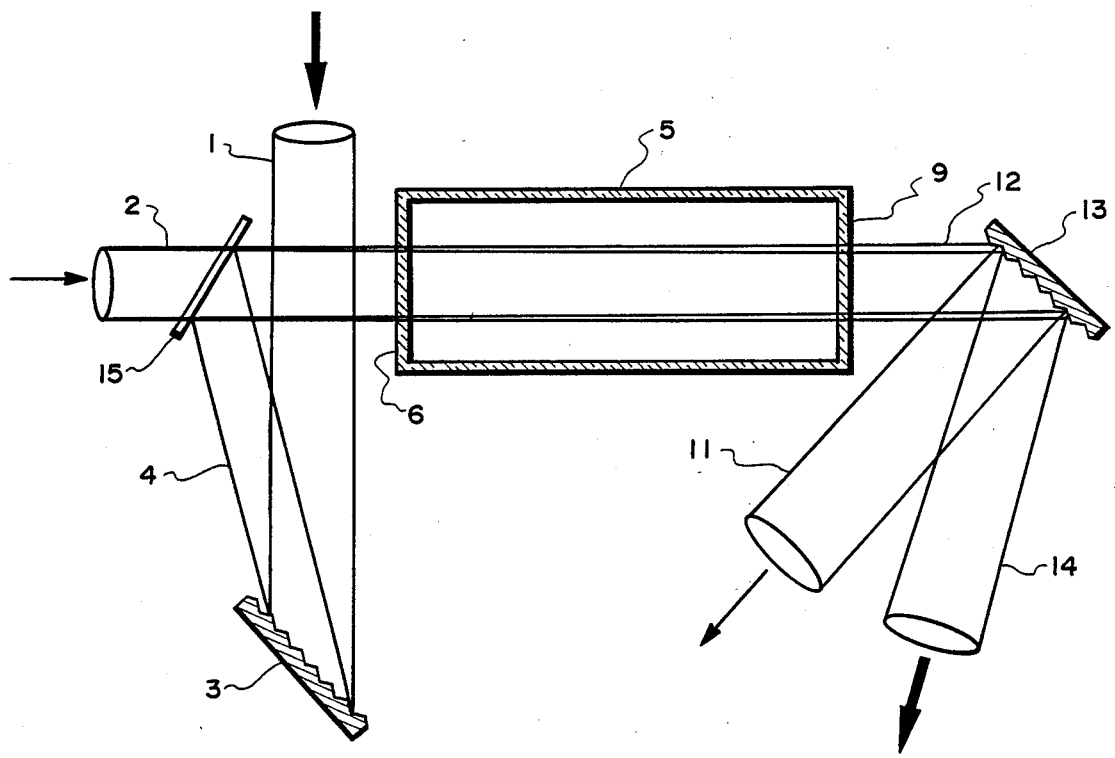
FIG. 2 shows a schematic view of a broad band near-collinear crossed-beam Raman amplifier.

In order to keep extremely broadband pump and Stokes beams in phase with each other over a longer path length the beams can be introduced to the Raman cell at a small angle (generally a few milliradians), as in FIG. 2. This is a near-collinear geometry described, for the two-line case, in patent application Ser. No. 07/286,029 filed by the U.S. Air Force on Dec. 14, 1988, which has the same inventors as this application, and is incorporated here by reference. Angle tuning can be used to overcome medium dispersion and thus allows for a shorter cell length as the energy is more efficiently transferred in a shorter beam length.

In FIG. 2 a near-collinear crossed-beam Raman amplifier is shown. Input pump beam 1 may have a spectrum composed of discrete lines or have a continuous spectra. The input pump beam is fanned by diffraction grating 3. The fanned pump beam 4 is combined nearly collinearly with Stokes seed beam 2 by dichroic beam splitter 15. The input pump and Stokes seed beams enter the Raman cell 5 at window 6. Their paths cross in cell 5 where the energy transfer from the input pump beam to the Stokes beam takes place.

The resultant Stokes output beam 12 and residual pump beam 11 emerge from the Raman cell 5 at window 9.

The crossing angle between the pump and Stokes beams in the Raman cell and the fanning angles in the input pump beam satisfy the phase matching condition.

A diffraction grating 13 may be employed so that the Stokes output beam 14 will be unfanned.

The near collinear crossed-beam Raman amplifier of FIG. 2 may be used with continuous or discrete line spectra in the pump and Stokes beams just as in the wide angle crossed-beam Raman amplifier.

The wide angle crossed beam Raman amplifier is considered to be an improvement over the near-collinear crossed-beam Raman amplifier. One of the advantages of the crossed-beam geometry over the near collinear geometry is improved intensity homogeneity. Since the beams cross each other many times there is spatial averaging of the two beams which results in a more homogenous Stokes output. The spatial averaging also reduces any coupling of intensity variations in the pump beam to the Stokes phase front. Another advantage is the ease of combining the beams, as it is difficult to combine high power beams collinearly. A further advantage is suppression of competing parametric processes which are phase-matched at small angles.

For crossed-beam Raman amplifiers to work effectively, the energy must transfer efficiently between the pump spectrum and the corresponding Stokes spectrum. This requires that all nonlinear polarization waves produced by the pump and Stokes lines add constructively by being in phase. This requirement can be met by the use of angle tuning in a crossed-beam Raman amplifier.

Phase matching of the wavevectors of the pump and Stokes beams is accomplished by angle-tuning, i.e. adjusting the wavevector directions. As the wavevector mismatch $\Delta k$ approaches zero the beams become phase-matched. For the two-line case (two pump lines plus two Stokes lines), the equation for this mismatch is $$\Delta \vec{k} = \vec{k}_{p1} - \vec{k}_{p2} + \vec{k}_{s2} - \vec{k}_{s1},$$

where $\vec{K}_{p1}$ and $\vec{K}_{p2}$ are the wavevectors of the two pump lines and $\vec{K}_{s1}$ and $\vec{K}_{s2}$ are the wavevectors of the two Stokes lines. The amplitudes of the wavevectors are fixed by the frequencies present in the input. The amplitude of the wavevector mismatch, however, is not fixed as it can be varied by changing the wavevector directions. For a given set of wavevector directions, the mismatch will be proportional to the bandwidth $\Delta \nu$ of the pump beam.

Figure 3:
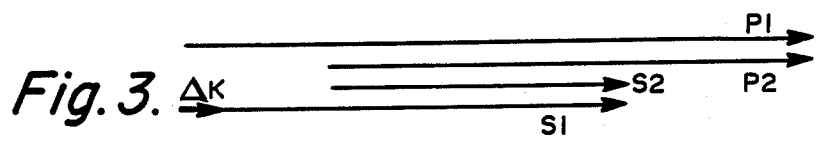
FIG. 3 shows a diagram of the input pump beam and Stokes seed beam wavevectors and the wavevector mismatch for a two-line collinear Raman amplifier. The vectors are displaced vertically for clarity.
Figure 4:
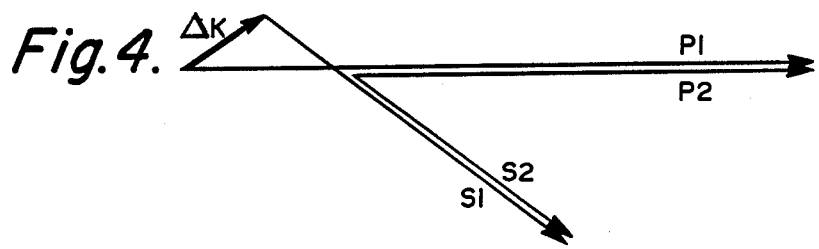
FIG. 4 shows a wavevector diagram of the same input pump beam and Stokes seed beam as in FIG. 3 with an increased mismatch for a two-line crossed-beam Raman amplifier.
Figure 5:
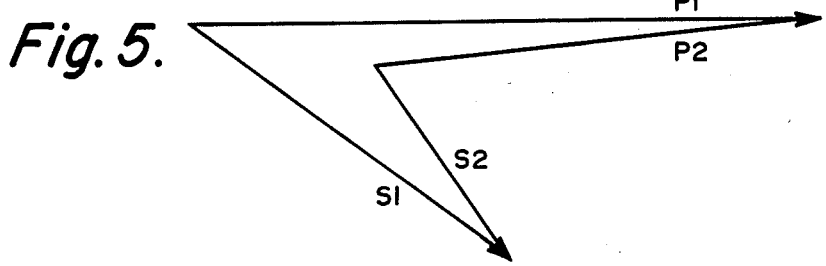
FIG. 5 shows a wavevector diagram of the same input pump beams and Stokes seed beams as in FIGS. 3 and 4, angle-tuned so as to be phase matched in a two-line crossed-beam Raman amplifier.

FIGS. 3, 4 and 5 illustrate how vector addition yields the wavevector mismatch $\Delta k$ for two-line Raman amplication. In FIG. 3 for a collinear geometry, a relatively small mismatch $\Delta k$ is produced by linear dispersion. This means that fairly large values of the bandwidth $\Delta \nu$ are allowed before $\Delta k$ becomes large enough to destroy the phase matching.

FIG. 4 shows an analogous vector addition for a crossed-beam geometry without angle tuning. It is seen how, using the same wavevector amplitudes as in FIG. 3, a much larger mismatch $\Delta k$ results. This means that the bandwidth $\Delta \nu$ must be severely reduced (typically below several GHz) in order to decrease $\Delta k$ sufficiently to achieve phase matching. Unless this is done, the Raman gain, and hence the Stokes output power, will be severely reduced.

As FIG. 5 shows, when the pump beams and Stokes beams are properly angle-tuned in a crossed-beam Raman amplifier, the wavevector mismatch $\Delta k$ is eliminated, resulting in high gain and therefore high Stokes output power.

Figure 6:
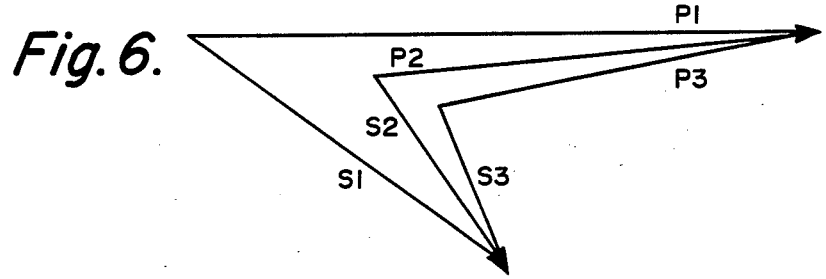
FIG. 6 shows a vector diagram of the input pump beam and Stokes seed beam phase-matched in a three-line crossed-beam Raman amplifier.

FIG. 6 shows how two-line phase matching is extended to three lines. The figure shows that lines 1 and 2 are phase matched, and lines 1 and 3 are phase-matched. It is seen that lines 2 and 3 must also be phase-matched. Since phase matching is thus a transitive property, it is therefore possible to use angle tuning to phase match simultaneously any number of pump and Stokes lines. The gain enhancement achieved is roughly proportional to the number of lines. The same argument allows gain enhancement of near-collinear geometries with any number of lines.

There are many possible combinations of fanning and crossing angles which result in the wavevectors adding so that $\Delta k$ equals zero. Therefore, the input pump beam and Stokes seed beam can be angle tuned at many different crossing angles.

Figure 7:
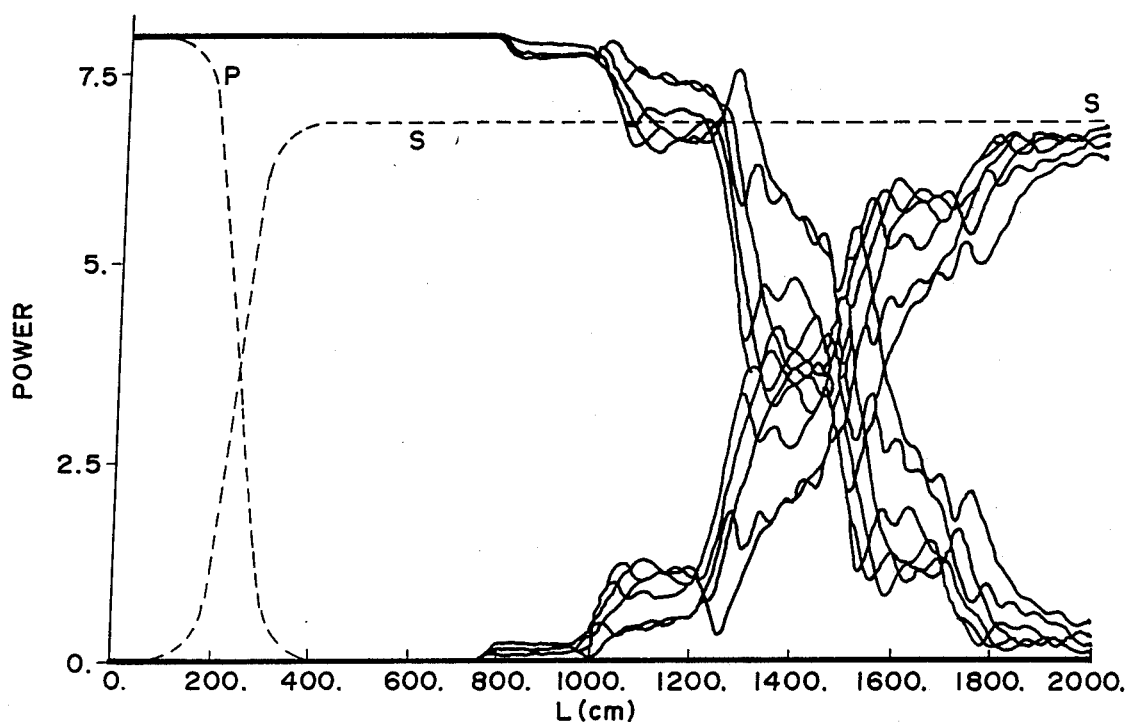
FIG. 7 shows results from a computer simulation of the power transfer from a six-line input pump beam to a six-line Stokes seed beam both with (dashed lines) and without (solid lines) angle-tuning.

FIG. 7 shows computer simulation results for an example of multi-line gain enhancement. The power in the pump (P) and Stokes (S) beams is shown as a function of the length L of the Raman cell. The pump spectrum contains six lines with a sufficiently large separation so that they are not phase-matched when collinear. The solid lines show the power transfer from the six pump lines to the six corresponding Stokes lines without angle-tuning. The dashed lines (identical for all six lines) show that with angle-tuning, the power transfer occurs in about one sixth the cell length due to a six-fold gain enhancement.

Since phase matching can be achieved by angle-tuning for any number of points within the pump spectrum, it follows that phase matching can be achieved for any arbitrary spectrum, whether it be continuous or discrete.

The Stokes seed beam 2 may be a fanned continuous or discrete spectrum, introduced at the proper angles for angle-tuned phase matching. This may be accomplished by use of an input grating similar to the input grating 3 to diffract the Stokes lines at the required angles.

If the spectrally fanned multiline or continuous broadband Stokes seed beam is used, it must be temporally correlated to the pump beam. This may be achieved in a seed beam produced by a Raman generator if pump and seed optical path lengths are matched within a coherence length. The advantage of using a fanned seed beam is to minimize the required cell length.

An alternative to the fanned seed beam is a single line or narrowband seed beam. If a single Stokes seed line beam is used at the proper angle, the remaining Stokes lines will be generated, through four wave mixing, in the medium in the Raman cell at the proper angles to match their corresponding pump lines. By using a seed with a bandwidth less than or equal to the Raman linewidth, both temporal correlation and spectral fanning of the seed become unnecessary. The mixing interactions in the Raman cell will parametrically generate new Stokes lines until the Stokes spectrum becomes as wide as the pump spectrum. If the seed propagates at the proper phase matching angle, then the generated lines will all be phase matched as well as temporally correlated.

The price paid for this simplification is the additional interaction length required for generation of the broad Stokes spectrum. For an amplifier with high conversion efficiency, this extra length is generally a small fraction of the total length.

In practice, the angles between wavevectors will exhibit deviations from the desired phase-matched values due to alignment errors, focussing errors, finite aperture diffraction, and wavefront aberrations. The reciprocal of the wavevector mismatch resulting from these angle deviations gives a characteristic length over which the four-wave mixing phase varies. Phase matching requires that this length be large relative to an e-fold gain length. A phase compensation effect will then be strong enough to maintain constructive interference between all the nonlinear polarization waves. This requirement sets a tolerance on the allowed angle errors which varies inversely with the bandwidth $\Delta \nu$:

$$\delta\theta \lesssim gIC \sin\theta/[2\pi\Delta\nu(1-\cos\theta)].$$

where g is the Raman gain coefficient, $\theta$ is the angle between pump and seed beams, I is the pump intensity, and c is the speed of light.

In the case of a zigzag configuration with reflections off cell walls separated by a distance $2a$, an additional tolerance on allowed angle deviations is set by the requirement that the temporal correlation between the pump and Stokes beams be maintained:

$$\delta\theta \lesssim 0.4\ c\ \cos(\theta/2)/(a\Delta\nu).$$

Although the preferred embodiment of the invention for the uses contemplated are disclosed above, it is possible to use the invention in other embodiments. For instance, the pump and Stokes beams need only cross once, thus eliminating the need for the mirrors 8. In another embodiment the Raman cell could be a section of optical fiber doped with a Raman medium and using the internal reflections of the optical fiber walls for a mirror.

What is claimed and desired to be secured by letters patent of the United States is:

1. A crossed-beam Raman amplifier having an input pump beam and a Stokes seed beam introduced into a Raman cell at wide angles providing a crossed-beam geometry in which said pump beam has plural pump lines each angle-tuned at a phase matching angle relative to a Stokes seed line, whereby the ratio of amplification to cell length is maximized.

2. A crossed-beam Raman amplifier as in claim 1 having a pair of parallel mirrors in the Raman cell to reflect the pump and Stokes seed beams in a crossed-beam zigzag geometry.

3. A crossed-beam Raman amplifier as in claim 1 where a diffraction grating is used to provide a spectrally fanned input pump beam.

4. A crossed-beam Raman amplifier as in claim 1 where a diffraction grating is used to make the Stokes output beam unfanned.

5. A crossed-beam Raman amplifier as in claim 1 where a diffraction grating is used to provide a spectrally fanned Stokes seed beam.

6. A crossed-beam Raman amplifier having an input pump beam and a Stokes seed beam introduced into a Raman cell at wide angles providing a crossed-beam geometry in which said pump beam has a continuous spectrum angle-tuned at phase matching angles relative to a corresponding spectrum of said Stokes seed beam, whereby the ratio of amplification to cell length is maximized.

7. A crossed-beam Raman amplifier as in claim 6 having a pair of parallel mirrors in the Raman cell to reflect the input pump and Stokes seed beams for a crossed-beam zigzag geometry.

8. A crossed-beam Raman amplifier as in claim 6 where a diffraction grating is used to provide a spectrally fannned input pump beam.

9. A crossed-beam Raman amplifier as in claim 6 where a diffraction grating is used to make a Stokes output beam unfanned.

10. A crossed-beam Raman amplifier as in claim 6 where a diffraction grating is used to provide a spectrally fanned Stokes seed beam.

* * * * *